Oct. 19, 1954     G. L. LUPFER     2,692,223
COMBINATION SOLVENT REFINING AND CATALYTIC CRACKING PROCESS
Filed Sept. 21, 1949
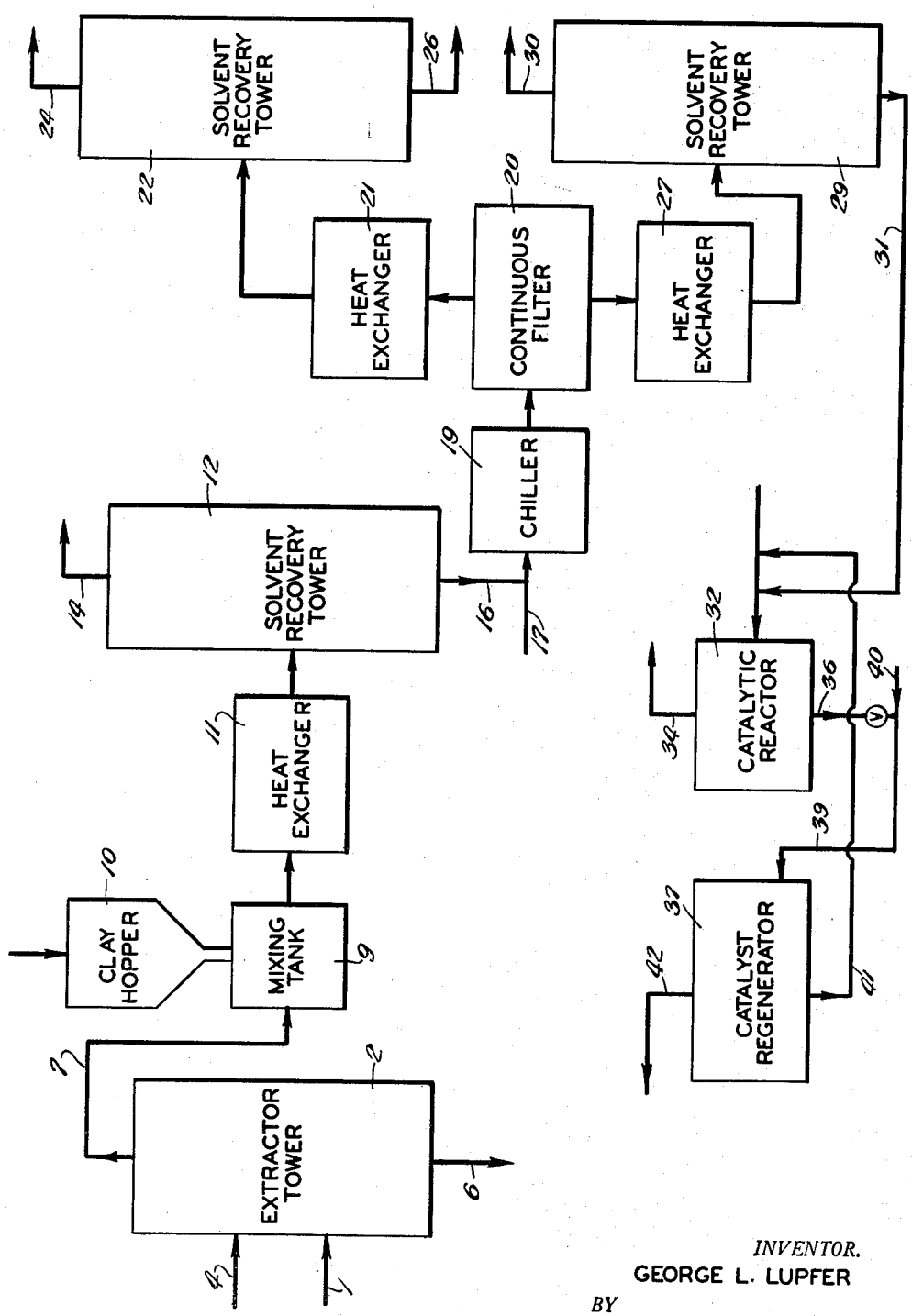
INVENTOR.
GEORGE L. LUPFER
BY
Campbell, Brumbaugh, Free & Graves
HIS ATTORNEYS Patented Oct. 19, 1954

2,692,223

UNITED STATES PATENT OFFICE 2,692,223

COMBINATION SOLVENT REFINING AND CATALYTIC CRACKING PROCESS

George L. Lupfer, Bedford, Ohio, assignor to The Standard Oil Company, Cleveland, Ohio, a corporation of Ohio Application September 21, 1949, Serial No. 116,978

4 Claims. (Cl. 196—14.15)

This invention relates to a method of treating hydrocarbons with an adsorbent contact catalytic material and more particularly to a novel combination of petroleum refining and catalytic cracking operations wherein the contact material from a refining plant is used as catalyst in a catalytic cracking process.

To cite an illustrative example without, however, intending to limit the scope of the invention thereto, the principle of this invention may be applied to the refining and decolorization of lubricating oil and to the catalytic cracking of hydrocarbons to form gasoline. By such application, it is possible to use the same material as adsorption and decolorizing agent in the refining process and as catalyst in the cracking operation. The refining operation may be carried out in one step, wherein all the impurities removed in the operation are adsorbed on the contact material, or in a plurality of steps, wherein only one or some of the impurities are adsorbed on the contact material and another or others are removed by one or more selective solvents also brought into contact with the oil.

The terms "adsorbent contact catalytic material" and "contact material," as used herein, refer to materials having adsorbent properties as well as catalytic activity.

Generally stated, the invention contemplates a method wherein a contact material is utilized first in a solvent lubricating oil refining plant and then, together with the impurities adsorbed therein, is utilized as make-up catalyst in a catalytic cracking reactor.

One advantage of this invention is that it provides a simple and economical supply of make-up catalyst for the reactor in a catalytic cracking unit.

Another advantage of the invention is that it minimizes the problems associated with the disposal of used contact material from an adsorption plant.

Still another advantage of the invention is that it provides an economical means for making available for cracking some of the impurities, such as wax, extracted from a lubricating oil during the refining thereof.

The contact material employed in the method of this invention may be any material known to have adsorptive as well as catalytic properties. The preferred material includes the silica-alumina type catalysts commonly referred to as contact clays, such as members of the group of acid-activated, natural clays made from the mineral montmorillonite, available from the Filtrol Corporation and marketed under trade names such as "Filtrol" and "Super Filtrol" lube contact clays, as well as fluid catalysts of the natural clay type available under the trade name "Filtrol D" and fluid catalysts made synthetically by precipitating alumina and silica, which are available as the spray-dried and oil dropped "Microsphere" type and "Diakell" catalysts available from The Universal Oil Products Company and M. W. Kellogg Company, respectively.

The method of this invention is illustrated in the accompanying drawing wherein the sole figure is a diagrammatic flow sheet illustrating one preferred embodiment of the method of this invention.

For the purpose of describing the embodiment of the invention illustrated in the drawing still more particularly in the form of a working example, it will be assumed that it is desired to refine 1000 barrels per day of lubricating stock in a refining plant and to convert 8000 barrels per day of a gas-oil charge in a catalytic cracking plant. It is to be understood, of course, that these rates, and the conditions referred to in the example, are specified merely for illustrative purposes and that the capacities of the plants are not particularly critical.

Referring now to the flow sheet, unrefined lubricating oil stock is charged by way of line 1 to the extractor tower at a rate of 1000 B. P. D. (barrels per day) and a first solvent, such as furfural, is introduced to the extractor tower 2 by way of line 4 at a rate of 3000 B. P. D. The unrefined oil stock may be any clean feed stock such as that produced by distillation, de-asphalting or other suitable means. The solvent may be present in a ratio of solvent to feed stock of from 1:1 to 10:1, depending upon the degree of refining desired.

The extracted material removed from the oil charge is largely aromatic in character and it leaves the extractor by way of line 6, usually with most of the solvent, and passes to a separate solvent recovery system. In the particular example described, the extracted material and solvent leave the extractor tower 2 by way of line 6 at rates of 300 and 2800 B. P. D., respectively.

Raffinate oil and solvent leave the extractor tower 2 by way of line 7 and enter the mixing tank 9 at rates of 700 B. P. D. and 200 B. P. D., respectively. Contact material is added to the mixing tank at a rate of 7000 lbs. per day by way of clay hopper 10 and stirred with the raffinate and solvent. Ordinarily, the amount of contact material used may be 1 to 25 lbs., and preferably varies between about 3 and about 15 lbs., per barrel of raffinate oil. The clay is maintained in a state of suspension in the tank 9 by any well-known means such as a mixer, not shown.

The slurry of raffinate solvent and contact material is then passed through a heat exchanger or oil heater 11 into a first solvent recovery tower 12. The temperature of the stream entering the tower 12 will be from 400° to 550° F., depending upon the type of stock being processed and upon pressure. The tower in this particular case is operated at a pressure of 100 mm. of mercury absolute. The solvent is separated by steam stripping and leaves the tower at 14.

Under the temperature conditions existing in the tower 12, the oil is decolorized by the action of the clay. The resultant slurry of decolorized oil stock and clay leaves the tower 12 at 16 at a rate of 700 B. P. D. of decolorized raffinate oil and 7000 lbs. per day of clay. 2100 B. P. D. of a dewaxing solvent, of a type well known in the art, and exemplified by methyl-ethyl-ketone, are introduced into the slurry by way of line 17 and the resultant stream is chilled by any appropriate means such as by ammonia expansion in a double pipe chiller 19 before being subjected to continuous filtration in a continuous filter 20. The temperature of the material leaving the chiller is such that the wax in the stock is largely insoluble and tends to precipitate on the clay. The filtrate from the continuous filter 20, which consists essentially of 560 B. P. D. of decolorized and dewaxed oil and 2000 B. P. D. of dewaxing solvent, is passed through a heat exchanger 21 wherein it is heated to a temperature sufficient to vaporize the dewaxing solvent in the second solvent recovery tower 22. 2000 B. P. D. of dewaxing solvent leave the tower 22 by way of line 24 and 560 B. P. D. of refined oil leave by line 26.

Clay, at a rate of 7000 lbs. per day, the wax thereon at a rate of 140 B. P. D., and 100 B. P. D. of dewaxing solvent pass from the filter 20 to a heat exchanger 27 wherein they are heated to a temperature sufficient to vaporize the dewaxing solvent. In a third solvent recovery tower 29, 100 B. P. D. of dewaxing solvent are recovered at 30 and 7000 lbs. per day of clay and 140 B. P. D. of wax thereon leave the solvent recovery tower by way of line 31.

The wax and clay are then conducted to the reactor 32 of a fluid catalytic cracking plant and are introduced therein as make-up catalyst with a charge of 8000 B. P. D. of gas-oil and regenerated catalyst. The cracked products leave at 34 for fractionation and the catalyst containing the spent clay from lube oil treatment, leaves by way of line 36. The spent catalyst is passed to a catalyst regenerator 37 through a line 39 under the impetus of regeneration air entering by way of line 40. The regenerated catalyst is recycled to the reactor 32 by way of line 41. 7000 lbs. per day of catalyst fines leave the regenerator at 42 with the flue gas and are discharged to the atmosphere or separated from the flue gas in the usual manner such as by means of a precipitator.

It will be apparent that inasmuch as the wax separated from the oil is charged to the catalytic reactor with the clay there is no necessity for separating wax of good color. Consequently, the sequence of the solvent extraction and solvent dewaxing operations described in the example may be reversed. Furthermore, the extract product as well as, or instead of, the wax may be charged to the catalytic reactor with the clay.

It is to be understood that numerous changes and modifications will immediately occur to those skilled in the art upon reading the foregoing description. It will also be understood that changes in material balance, operating conditions and solvent may be made without departing from the spirit of the invention. The arrangement of heat exchangers and other auxiliary equipment may also be changed to suit particular operation conditions without departing from the spirit of the invention. It is to be understood therefore that the scope of the invention is not to be limited except as defined in the appended claims.

I claim:

1. A process for refining a mineral oil stock and catalytically cracking hydrocarbons which comprises adding a selective, impurity-separating solvent to said stock, separating said impurity, adding a fresh, unregenerated, decolorizing contact material selected from the group consisting of contact clays and fluid catalysts of the natural clay and synthetic silica-alumina type to the mixture of oil stock and solvent, heating the resultant slurry of oil stock, solvent and contact material to separate the solvent and improve the color of the oil stock, adding a second solvent to the slurry of oil stock and contact material, separating a second impurity and said contact material from the oil stock and said second solvent, recovering any residual solvent from said separated second impurity and said contact material, separating said second solvent from said refined oil stock, and introducing said unregenerated contact material and said second impurity deposited thereon into a catalytic cracking reactor as make-up catalyst for the catalytic conversion of hydrocarbons.

2. A process for refining a mineral oil stock and catalytically cracking hydrocarbons which comprises adding a selective, impurity-separating solvent to said stock, separating said impurity, adding a fresh, unregenerated decolorizing contact clay to the mixture of oil stock and solvent, heating the resultant slurry of oil stock, solvent and clay to separate the solvent and improve the color of the oil stock, adding a second solvent to the oil stock and clay slurry, separating a second impurity and said clay from the oil stock, recovering any residual second solvent from said separated second impurity and clay, separating said second solvent from said refined oil stock, and introducing said unregenerated clay and said second impurity deposited thereon into a catalytic cracking reactor as make-up catalyst for the catalytic conversion of hydrocarbons.

3. A process for refining a mineral oil stock and catalytically cracking hydrocarbons which comprises adding furfural to said stock, separating the extract, adding a fresh, unregenerated decolorizing contact clay to the mixture of oil stock and furfural, heating the resultant slurry of oil stock, furfural and clay to separate the furfural and improve the color of the oil stock, adding methyl-ethyl-ketone to the slurry of refined oil stock and clay, chilling the slurry to precipitate wax from the oil, separating the wax and said clay from the oil stock, recovering any residual methyl-ethyl-ketone from said separated wax and clay, separating the methyl-ethyl-ketone from said refined oil stock, and introducing said unregenerated clay and the wax precipitated thereon into a catalytic cracking reactor as make-up catalyst for the catalytic conversion of hydrocarbons.

4. A process for refining a mineral oil stock and catalytically cracking hydrocarbons which comprises adding methyl-ethyl-ketone to said stock, chilling the mixture to separate wax from the oil and methyl-ethyl-ketone, removing the wax, adding a fresh, unregenerated decolorizing contact clay to the mixture of oil stock and methyl-ethyl-ketone, heating the resultant slurry of oil stock, methyl-ethyl-ketone and clay to separate the methyl-ethyl-ketone and improve the color of the oil stock, adding furfural to the slurry of oil stock and clay, separating the furfural and the clay from the refined oil stock, separating the furfural from the clay to deposit the extract on the clay, and introducing said unregenerated clay and the extract adsorbed thereon into a catalytic cracking reactor as make-up catalyst for the catalytic conversion of hydrocarbons.

References Cited in the file of this patent

UNITED STATES PATENTS

| Number | Name | Date |
| --- | --- | --- |
| 2,054,052 | Govers | Sept. 8, 1936 |
| 2,091,892 | Stratford | Aug. 31, 1937 |
| 2,487,796 | Evans | Nov. 15, 1949 |
| 2,549,518 | Perry | Apr. 17, 1951 |
| 2,602,044 | Lupfer et al. | July 1, 1952 |